(12) United States Patent
Teshima

(10) Patent No.: US 11,297,200 B2
(45) Date of Patent: Apr. 5, 2022

(54) IMAGE FORMING APPARATUS WHICH PERFORMS A PROCESS BASED UPON A RECOGNIZED COLOR OF A MARKED REGION OF ORIGINAL IMAGE DATA

(71) Applicant: KYOCERA Document Solutions Inc., Osaka (JP)

(72) Inventor: Kentaro Teshima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 118 days.

(21) Appl. No.: 16/797,802

(22) Filed: Feb. 21, 2020

(65) Prior Publication Data
US 2020/0274989 A1    Aug. 27, 2020

(30) Foreign Application Priority Data
Feb. 27, 2019    (JP) .............................. JP2019-033625

(51) Int. Cl.
*H04N 1/32*    (2006.01)
*H04N 1/00*    (2006.01)

(52) U.S. Cl.
CPC ..... *H04N 1/32272* (2013.01); *H04N 1/00737* (2013.01); *H04N 1/00763* (2013.01); *H04N 1/00777* (2013.01); *H04N 1/00782* (2013.01); *H04N 1/32309* (2013.01); *H04N 1/32352* (2013.01)

(58) Field of Classification Search
None
See application file for complete search history.

(56) References Cited

U.S. PATENT DOCUMENTS 9,762,761  B2 *   9/2017  Sadakuni ........... H04N 1/00875
2013/0272523 A1 * 10/2013  McCorkindale ....... H04N 1/444
                                                          380/243

FOREIGN PATENT DOCUMENTS

JP           2011-151469 A      8/2011

* cited by examiner

*Primary Examiner* — Barbara D Reinier
(74) *Attorney, Agent, or Firm* — Stein IP, LLC

(57) ABSTRACT

An image forming apparatus has an input portion that receives original image data, a control portion that generates output image data based on the original image data, a printing portion that performs printing based on the output image data, and a storage portion. The storage portion stores associated color information that defines colors associated with a plurality of prescribed processes respectively. When generating the output image data, the control portion, if the original image data includes a marked region, performs, out of the plurality of processes, the process associated with the color of the marked region.

6 Claims, 8 Drawing Sheets

ORIGINAL IMAGE DATA

OUTPUT IMAGE DATA

ORIGINAL IMAGE DATA

OUTPUT IMAGE DATA

ORIGINAL IMAGE DATA

OUTPUT IMAGE DATA

ORIGINAL IMAGE DATA

OUTPUT IMAGE DATA

IMAGE FORMING APPARATUS WHICH PERFORMS A PROCESS BASED UPON A RECOGNIZED COLOR OF A MARKED REGION OF ORIGINAL IMAGE DATA

INCORPORATION BY REFERENCE

This application is based on and claims the benefit of Japanese Patent Application No. 2019-033625 filed on Feb. 27, 2019, the contents of which are hereby incorporated by reference.

BACKGROUND

The present disclosure relates to an image forming apparatus that performs printing.

Some conventionally known image forming apparatuses are furnished with a function of detecting a marked region in original image data and encoding information included in the marked region.

A conventional image forming apparatus detects a marked region in original image data obtained by scanning a document. Moreover, the conventional image forming apparatus performs processing to generate output image data which is data in which the marked region in the original image data has been converted to a blacked-out or blank region and which is data including a code image in which information included in the marked region in the original image data has been encoded. Then the conventional image forming apparatus performs printing based on the original image data.

As a result, a sheet having the code image printed on it is output. Of the sheet having the code image printed on it, the region corresponding to the marked region appears as a blacked-out or blank region. That is, the information in the marked region is encrypted.

SUMMARY

According to one aspect of the present disclosure, an image forming apparatus includes an input portion, a control portion, a printing portion, and a storage portion. The input portion feeds original image data to the image forming apparatus. The control portion generates output image data based on the original image data. The printing portion performs printing based on the output image data. The storage portion stores associated color information that defines colors associated with a plurality of prescribed processes respectively. When generating the output image data, the control portion, if the original image data includes a marked region, recognizes the color of the marked region and performs, out of the plurality of processes, the process associated with the color of the marked region.

DETAILED DESCRIPTION

Configuration of an Image Forming Apparatus

Figure 1:
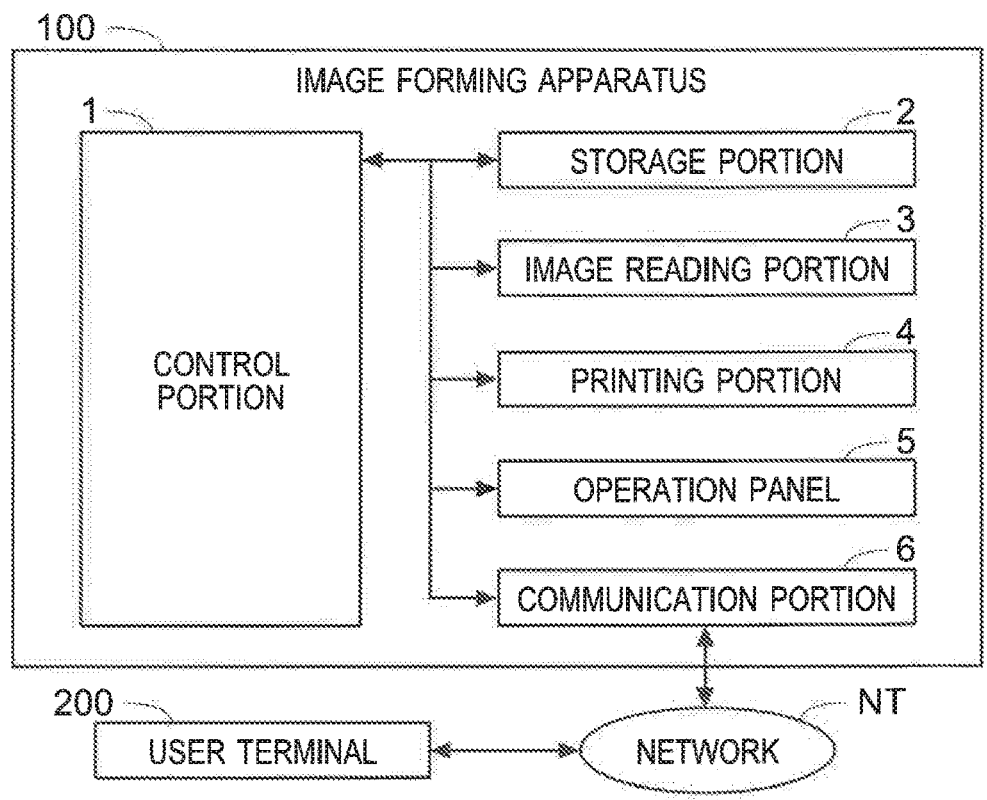
FIG. 1 is a block diagram showing a configuration of an image forming apparatus according to one embodiment of the present disclosure.

As shown in FIG. 1, an image forming apparatus 100 according to one embodiment of the present disclosure includes a control portion 1 and a storage portion 2. The control portion 1 includes a CPU. The control portion 1 performs processing to control different parts of the image forming apparatus 100 based on control programs and control data. The storage portion 2 includes storage devices such as a ROM, a RAM, and a HDD. The storage portion 2 is connected to the control portion 1. The control programs and the control data are stored in the storage portion 2.

The image forming apparatus 100 also includes an image reading portion 3 and a printing portion 4. The control portion 1 controls the reading operation of the image reading portion 3, and controls the printing operation of the printing portion 4. An outline of the image reading portion 3 and the printing portion 4 is shown in FIG. 2.

The image reading portion 3 reads a document D and generates the image data of the document D. In other words, the image reading portion 3 feeds the image data of the document D into the image forming apparatus 100. The image reading portion 3 includes a platen glass PG. The document D as the reading target is placed on the platen glass PG.

The image reading portion 3 includes a reading unit that reads the document D optically. The reading unit includes a light source 31 and an image sensor 32. The light source 31 irradiates the document D on the platen glass PG with light. The image sensor 32 receives the light reflected from the document D and performs photoelectric conversion.

Figure 2:
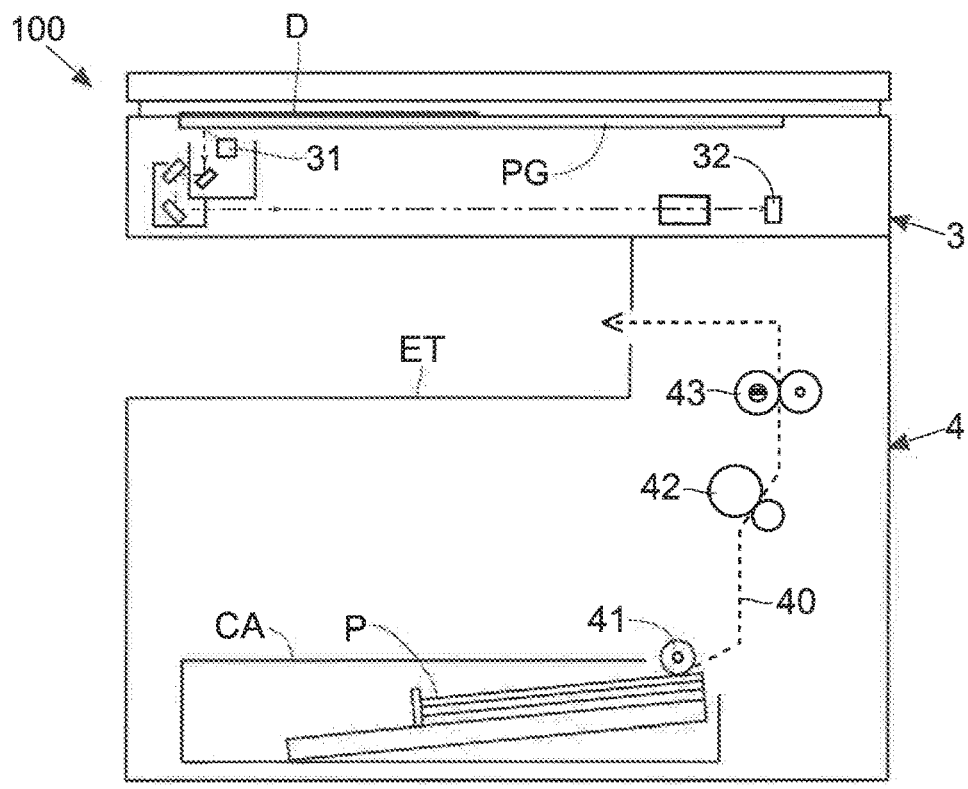
FIG. 2 is a diagram showing an outline of a construction of the image forming apparatus according to the embodiment of the present disclosure.

The printing portion 4 conveys a sheet P along a sheet conveying passage 40 (indicated by a broken line in FIG. 2). The printing portion 4 forms an image to be printed. Then the printing portion 4 prints the image on the sheet P being conveyed.

The printing portion 4 includes a sheet feed roller 41. The sheet feed roller 41 makes contact with a sheet P stored in a sheet cassette CA, and rotates in that state to feed the sheet P from the sheet cassette CA into the sheet conveying passage 40. Though not illustrated, on the downstream side of the sheet feed roller 41 in the sheet conveying direction, a pair of separation rollers is provided to separate one from another the sheets P extracted from the sheet cassette CA by the sheet feed roller 41.

The printing portion 4 also includes a pair of transfer rollers 42. The pair of transfer rollers 42 includes a photosensitive drum and a transfer roller. The photosensitive drum carries a toner image on its circumferential surface. The transfer roller is in pressed contract with the photosensitive drum, and forms a transfer nip against the photosensitive drum. The pair of transfer rollers 42, by rotating, conveys the sheet P that has entered the transfer nip and meanwhile transfers the toner image to the sheet P.

Though not illustrated, the printing portion 4 further includes a charging device, an exposure device, and a developing device. The charging device electrostatically charges the circumferential surface of the photosensitive drum. The exposure device forms an electrostatic latent image on the circumferential surface of the photosensitive drum. The developing device develops the electrostatic latent image on the circumferential surface of the photosensitive drum into a toner image.

The printing portion 4 also includes a pair of fixing rollers 43. The pair of fixing rollers 43 includes a heating roller and a pressing roller. The heating roller incorporates a heater (not shown). The pressing roller is in pressed contact with the heating roller, and forms a fixing nip against the heating roller. The fixing rollers 43, by rotating, transfer the sheet P that has entered the fixing nip and meanwhile fix the toner image transferred to the sheet P. The sheet P having passed through the fixing nip is ejected onto an ejection tray ET.

As shown back in FIG. 1, the image forming apparatus 100 includes an operation panel 5. The operation panel 5 includes a touch screen. The touch screen displays a screen, and receives touch operations from a user. The operation panel 5 also includes hardware buttons. The hardware buttons include, among others, a Start button for receiving from the user a request to execute a job involving the reading of the document D.

The operation panel 5 is connected to the control portion 1. The control portion 1 controls the display operation of the operation panel 5. The control portion 1 also detects operations performed on the operation panel 5. When the control portion 1, with a document D placed on the platen glass PG, detects an operation on the Start button on the operation panel 5, the control portion 1 judges that a request to execute a job involving the reading of the document D has been received. Then the control portion 1 makes the image reading portion 3 read the document D.

The image forming apparatus 100 includes a communication portion 6. The communication portion 6 is an interface that connects the image forming apparatus 100 to a network NT such as the Internet. The communication portion 6 includes, for example, a LAN communication circuit for communication via a LAN. The communication portion 6 is connected to an access point of a wireless LAN.

The control portion 1 controls the LAN communication circuit in the communication portion 6, and communicates with an external device connected to the network NT. The external device connected to the network NT can be, for example, a user terminal 200 that is used by the user of the image forming apparatus 100. The user terminal 200 can be, for example, a personal computer, a smartphone, or a tablet computer.

Here, the image forming apparatus 100 is furnished with a character recognition function. Processing related to the character recognition function (i.e., character recognition processing) is performed by the control portion 1. The control portion 1 performs the character recognition function based on a character recognition program. The character recognition program is stored in the storage portion 2. Character recognition processing employs OCR technology. The control portion 1 performs character recognition processing on the image data resulting from a document D being read by the image reading portion 3.

To enable the control portion 1 to perform character recognition processing, a character database that contains standard patterns (character patterns) for pattern matching is stored in the storage portion 2. When performing character recognition processing, the control portion 1 extracts character images from image data as the processing target and compares the extracted character images with the standard patterns to detect characters (including numerals and symbols) present in the image data as the processing target.

Job Involving the Reading of a Document

When the control portion 1 judges that the operation panel 5 has received a request to execute a job involving the reading of a document D, the control portion 1 makes the image reading portion 3 read the document D. The image reading portion 3 reads the document D and generates the image data of the document D (feeds the image data of the document D into the image forming apparatus 100). Here, the image data of the document D corresponds to "original image data". Thus, the image reading portion 3 corresponds to an "input portion". In the following description, the image data of the document D is referred to as the original image data.

When the reading of the document D by the image reading portion 3 is complete (when original image data is fed into the image forming apparatus 100), the control portion 1 generates output image data based on the original image data. Then the control portion 1 makes the printing portion 4 perform printing. The printing portion 4 forms an image based on the output image data, and prints the formed image on a sheet P.

Figure 3:
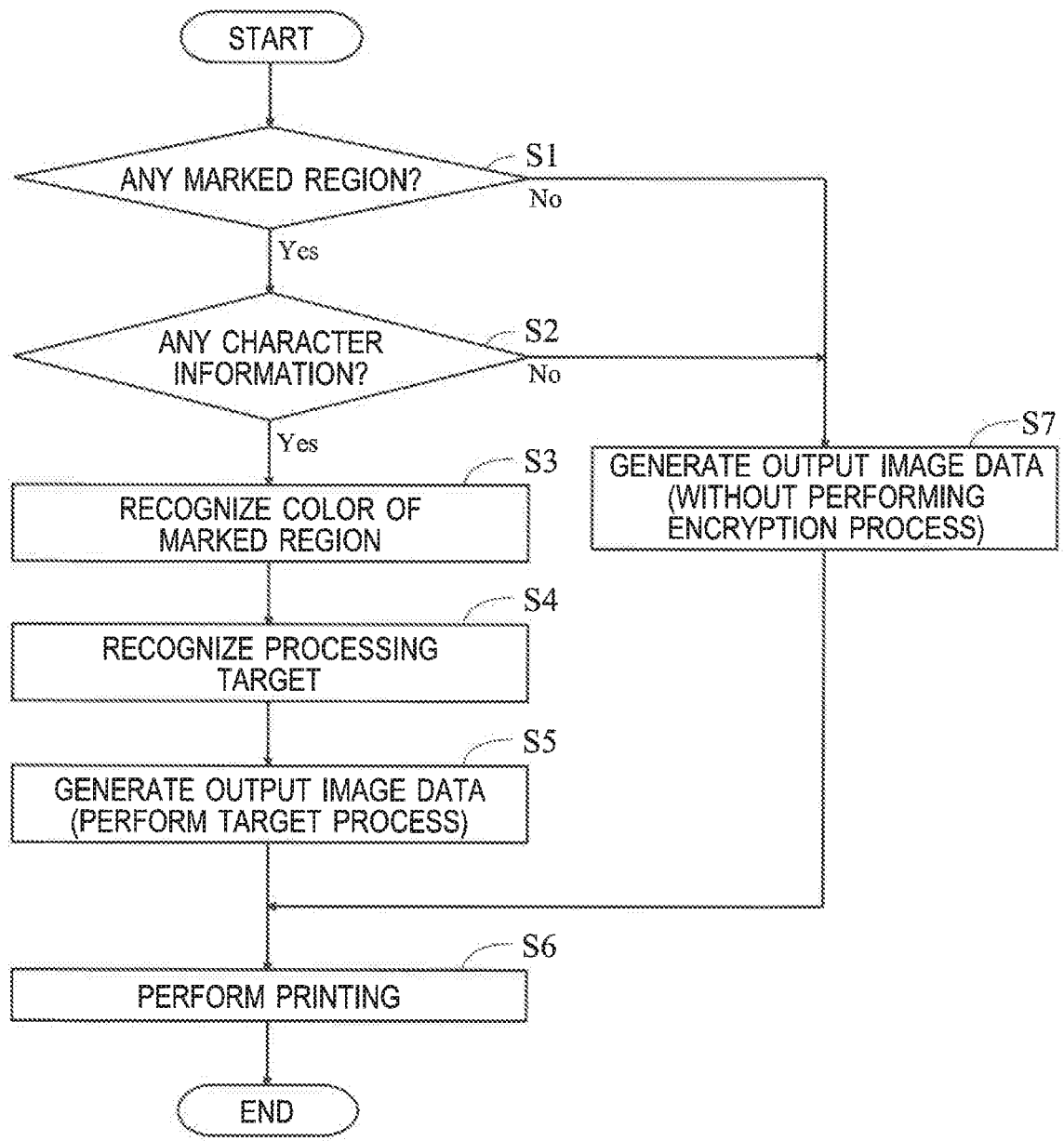
FIG. 3 is a flow chart showing a procedure performed by a control portion in the image forming apparatus according to the embodiment of the present disclosure.

Here, when generating the output image data, the control portion 1 performs processing according to the flow chart shown in FIG. 3. This will now be described specifically below.

The procedure shown in FIG. 3 starts when the reading of the document D by the image reading portion 3 is complete (when original image data is fed into the image forming apparatus 100). On completion of the reading of the document D, the control portion 1 acquires original image data.

At step S1, the control portion 1 checks whether the original image data includes a marked region. Here, the control portion 1 performs marking detection processing to detect a marked region in the original image data. In the marking detection processing by the control portion 1, a region that appears in the original image data when a part of the document D read by the image reading portion 3 is marked (colored, highlighted) in one of a plurality of predetermined colors is detected as a marked region. The predetermined colors are, for example, fluorescent colors. Marking is applied using a writing implement such as a fluorescent pen.

If, at step S1, the control portion 1 judges that the original image data includes a marked region (if a marked region is detected in the marking detection processing), the procedure proceeds to step S2. At step S2, the control portion 1 performs character recognition processing on the marked region, and checks whether the marked region includes character information (information including characters, numerals, symbols, and the like). If, as a result, the control portion 1 judges that the marked region includes character information, the procedure proceeds to step S3.

At step S3, the control portion 1 recognizes the color of the marked region (which of the plurality of predetermined colors it is). That is, the control portion 1 recognizes the color of the writing implement (fluorescent pen) that the user used to mark the document D. Then, at step S4, the control portion 1 recognizes, out of a plurality of prescribed encryption processes, the encryption process associated with the color of the marked region. In the following description, an encryption process associated with a color of a marked region is occasionally referred to as a target process.

As will be described in detail later, encryption processes are processes that are performed by the control portion 1. As encryption processes, the control portion 1 performs processes that encrypt character information included in a marked region. For example, the encryption processes include a first process, a second process, a third process, and a fourth process. The first to fourth processes are associated with different predetermined colors respectively. Associated color information that defines the predetermined colors respectively associated with the first to fourth processes is previously stored in the storage portion 2. For example, the first process is associated with red, the second process is associated with blue, the third process is associated with green, and the fourth process is associated with yellow.

The colors associated with the first to fourth processes can be changed freely by the user. Such change is accepted on the operation panel 5. Such change may be made also from the user terminal 200.

After step S4, the procedure proceeds to step S5. At step S5, the control portion 1 generates output image data based on the original image data. Here, the control portion 1 performs a target process (one of the first to fourth processes that is associated with the color of the marked region), and thereby generates output image data in which the character information in the marked region has been encrypted. Subsequently, at step S6, the control portion 1 makes the printing portion 4 perform printing based on the output image data.

If, at step S1, the control portion 1 judges that the original image data includes no marked region (if no marked region is detected in the marking detection processing), the procedure proceeds to step S7. Also if, at step S2, the control portion 1 judges that the marked region includes no character information, the procedure proceeds to step S7.

At step S7, the control portion 1 generates output image data based on the original image data. In this case, however, the control portion 1 performs no encryption process. Subsequently, the procedure proceeds to step S6.

Now, with reference to FIGS. 4 to 9, what is performed in each of the plurality of encryption processes (first to fourth processes) will be described in detail. In each of FIGS. 4 to 9, the upper part of the diagram shows original image data, and the lower part of the diagram shows output image data. For the sake of convenience, it is here assumed that the original image data shown in all of those diagrams includes a marked region M. Of the marked.regions M shown in those diagrams, a red marked region is indicated by the symbol M1, a blue marked region is indicated by the symbol M2, a green marked region is indicated by the symbol M3, and a yellow marked region is indicated by the symbol M4. In FIGS. 4 to 9, the character information included in a marked region M is represented by the string of characters "abcde". The different colors of the marked regions M are represented by different patterns inside the regions.

(First Process)

Figure 4:
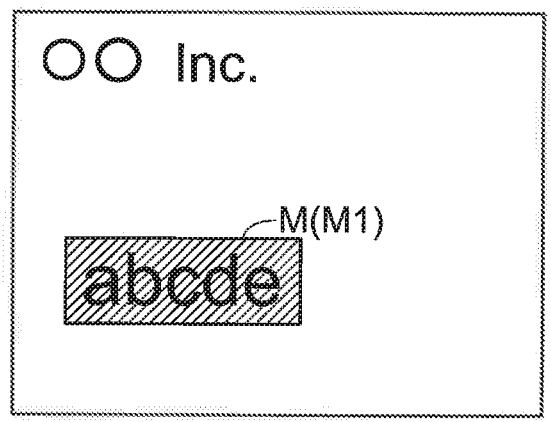
FIG. 4 is a diagram illustrating a first process performed by the control portion in the image forming apparatus according to the embodiment of the present disclosure.
Figure 4:
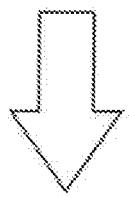
Figure 4:
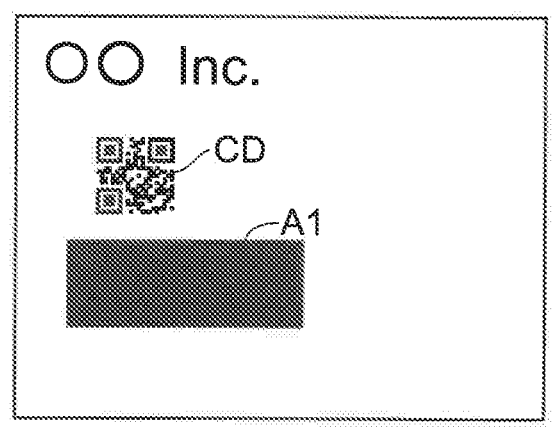

In a case where original image data as shown in FIG. 4 is fed into the image forming apparatus 100, the color of the marked region M1 is red; thus, out of the plurality of encryption processes (first to fourth processes), the first process, which is associated with red, is performed by the control portion 1. That is, the first process is the target process. The first process as an encryption process is an encoding process.

Here, in the storage portion 2 is previously stored a program related to the encoding process. Based on this program, the control portion 1 performs the encoding process. In the encoding process by the control portion 1, a code image is generated from the information that is the target of encoding. For example, the code image is a two-dimensional code (such as a QR code (a registered trademark)).

In a case where the target process is the first process (encoding process), as shown in FIG. 4, the control portion 1 generates, as output image data, data in which a marked region M1 in the original image data has been converted to a blacked-out region (a region inside which all the pixels are black). Thus, even when printing based on the output image data is performed, the character information in the marked region M1 is not divulged. In FIG. 4, the region in the output image data corresponding to the marked region M1 is indicated by the symbol A1. Similar convention applies also to FIGS. 5 and 6, which will be referred to later.

The control portion 1 also generates a code image CD in which the character information included in the marked region M1 has been encoded, and adds the code image CD to the data (output image data) resulting from the marked region M1 being converted to the blacked-out region. Here, the control portion 1 arranges the code image CD at a position where it does not overlap the region A1.

Though not illustrated, in the output image data, the marked region M1 may be converted to a blank region (a region with no image inside it). In that case, the code image CD may be arranged at a position where it overlaps the region A1.

As a modified example of the first process, the code image CD may be arranged at a position where the user wants it to be. Specifying the arrangement position of the code image CD requires, as operations to be performed by the user, in addition to a marking operation in which the user marks, out of the information included in the document D, the character information that the user wants to be encrypted, a position specifying operation in which the user inscribes in the document D a position specifying image PS (see FIG. 5) in the same color that the user used for marking. The position specifying image PS is an image with which to specify the position of the code image CD. The position specifying image PS can be inscribed wherever the user likes. The position specifying image PS may be in any shape. The position specifying image PS may be an image of a frame.

Figure 5:
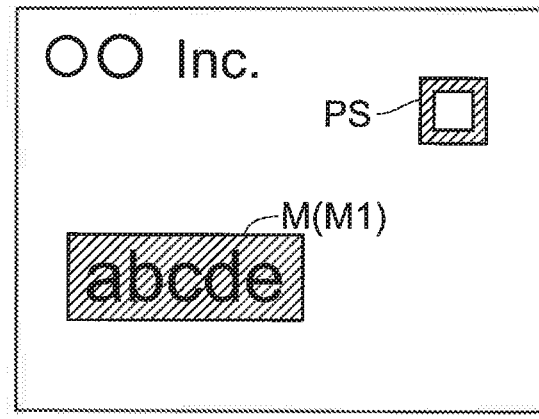
FIG. 5 is a diagram illustrating a modified example of the first process performed by the control portion in the image forming apparatus according to the embodiment of the present disclosure.
Figure 5:
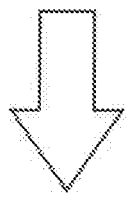
Figure 5:
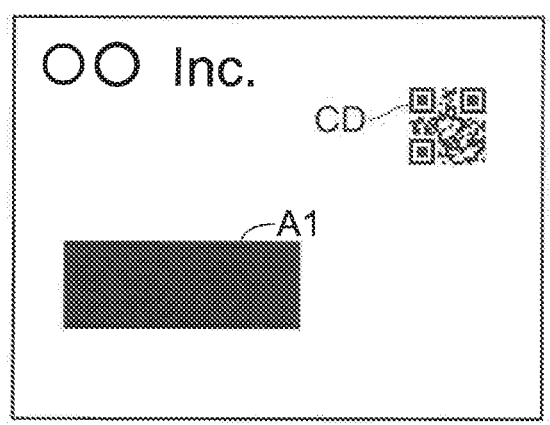

For example, suppose that original image data as shown in FIG. 5 is fed into the image forming apparatus 100. In this example, the control portion 1 judges that the original image data includes a position specifying image PS in the same color as the marked region M1. If the original image data includes a position specifying image PS in the same color as the marked region M1, the control portion 1 sets the position of the position specifying image PS as the target position. Then the control portion 1 arranges the code image CD at the target position. The position specifying image PS is eventually erased.

Figure 6:
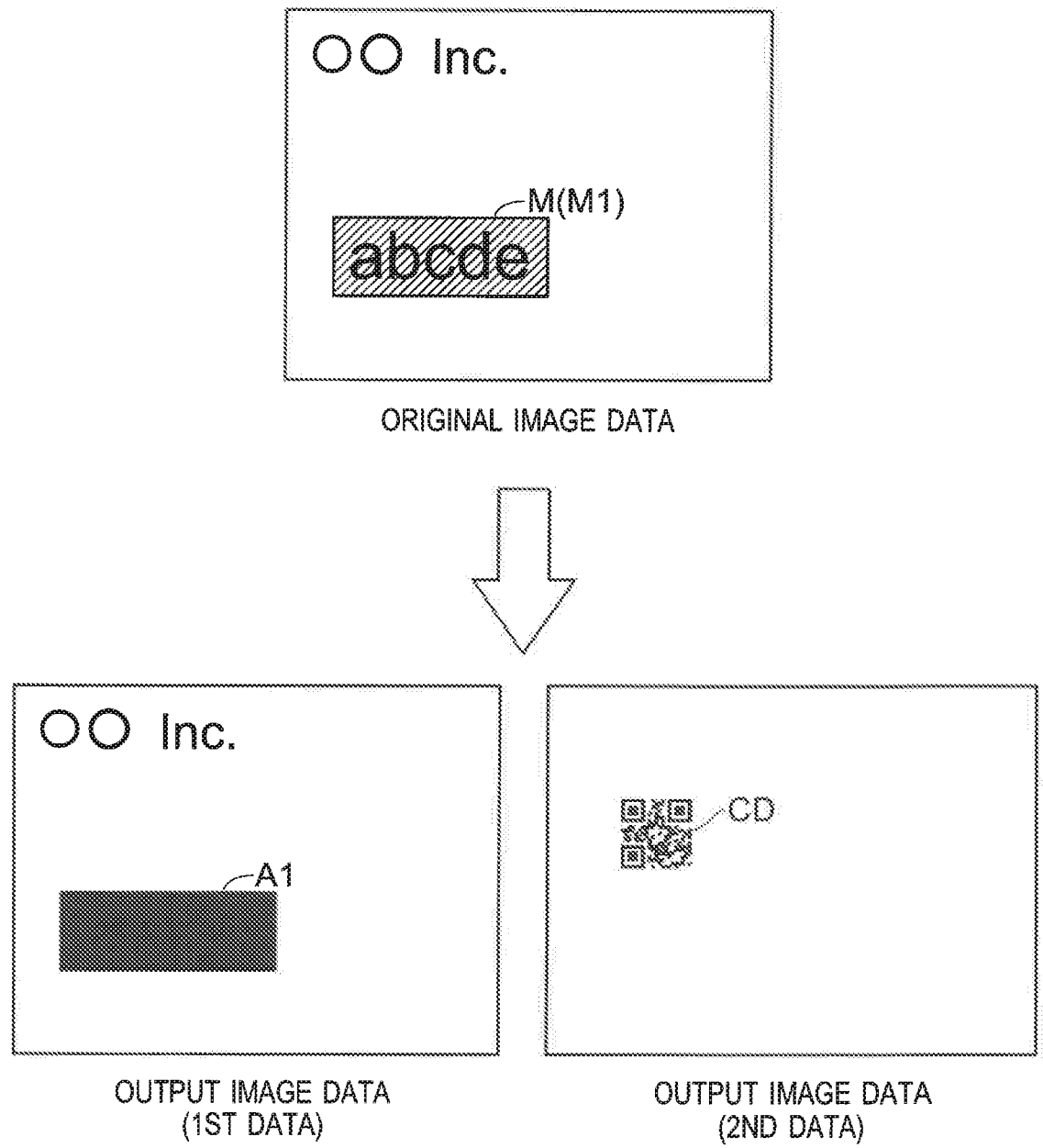
FIG. 6 is a diagram illustrating the modified example of the first process performed by the control portion in the image forming apparatus according to the embodiment of the present disclosure.

On the other hand, if, as shown in FIG. 6, the original image data includes no position specifying image PS in the same color as the marked region M1, the control portion 1 generates first data and second data as output image data. The first data as the output image data is data in which the marked region M1 in the original image data has boon converted to a blacked-out region (which may instead be a blank region), and is data that includes no code image CD.

The second data as the output image data is data that includes a code image CD. When first and second data are generated as output image data, the printing portion 4 prints an image based on the first data on one sheet P. and prints an image based on the second data on another sheet P.

(Second Process)

Figure 7:
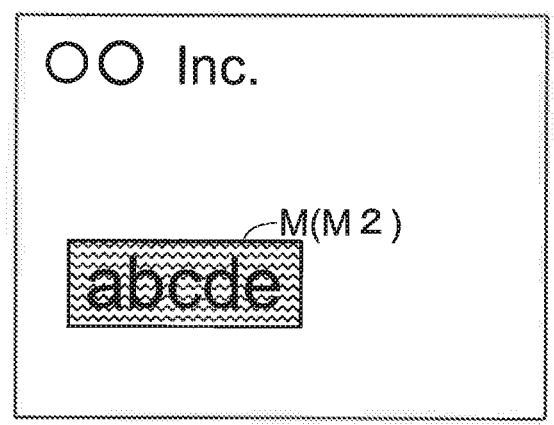
FIG. 7 is a diagram illustrating a second process performed by the control portion in the image forming apparatus according to the embodiment of the present disclosure.
Figure 7:
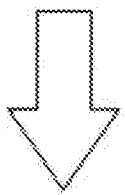
Figure 7:
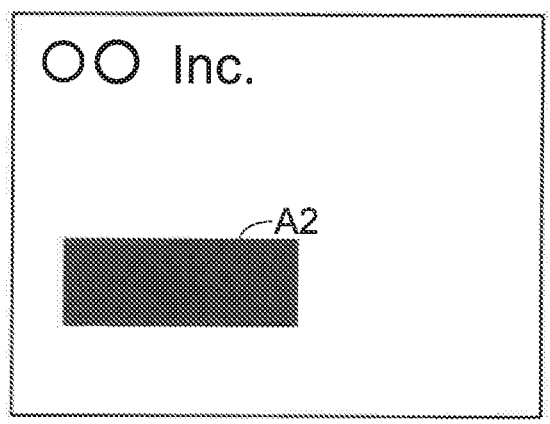

In a case where original image data as shown in FIG. 7 is fed into the image forming apparatus 100, the marked region M2 is blue; thus, out of the plurality of processes (first to fourth processes), the second process, which is associated with blue, is performed by the control portion 1. That is, the second process is the target process. The second process as an encoding process is a blacking-out process.

In a case where the target process is the second process (blacking-out process), as shown in FIG. 7, the control portion 1 generates, as output image data, data in which the marked region M2 in the original image data has been converted to a blacked-out region. Thus, even when printing based on the output image data is performed, the character information in the marked region M2 is not divulged. In FIG. 7, the region in the output image data corresponding to the marked region M2 is indicated by the symbol A2.

(Third Process)

Figure 8:
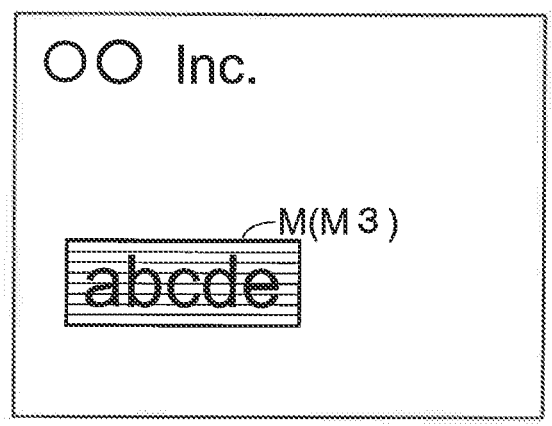
FIG. 8 is a diagram illustrating a third process performed by the control portion in the image forming apparatus according to the embodiment of the present disclosure.
Figure 8:
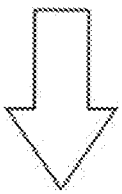
Figure 8:
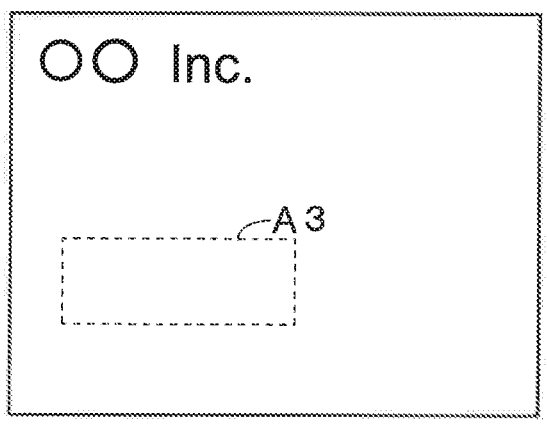

In a case where original image data as shown in FIG. 8 is fed into the image forming apparatus 100, the marked region M3 is green; thus, out of the plurality of processes (first to fourth processes), the third process, which is associated with green, is performed by the control portion 1. That is, the third process is the target process. The third process as an encoding process is an erasing process.

In a case where the target process is the third process (erasing process), as shown in FIG. 8, the control portion 1 generates, as output image data, data in which the marked region M3 in the original image data has been converted to a blank region. In other words, the control portion 1 erases the image in the marked region M3 from the original image data. Thus, even when printing based on the output image data is performed, the character information in the marked region M3 is not divulged. In FIG. 8, the region in the output image data corresponding to the marked region M3 is indicated by the symbol A3, and the region A3 is enclosed by a broken line.

(Fourth Process)

Figure 9:
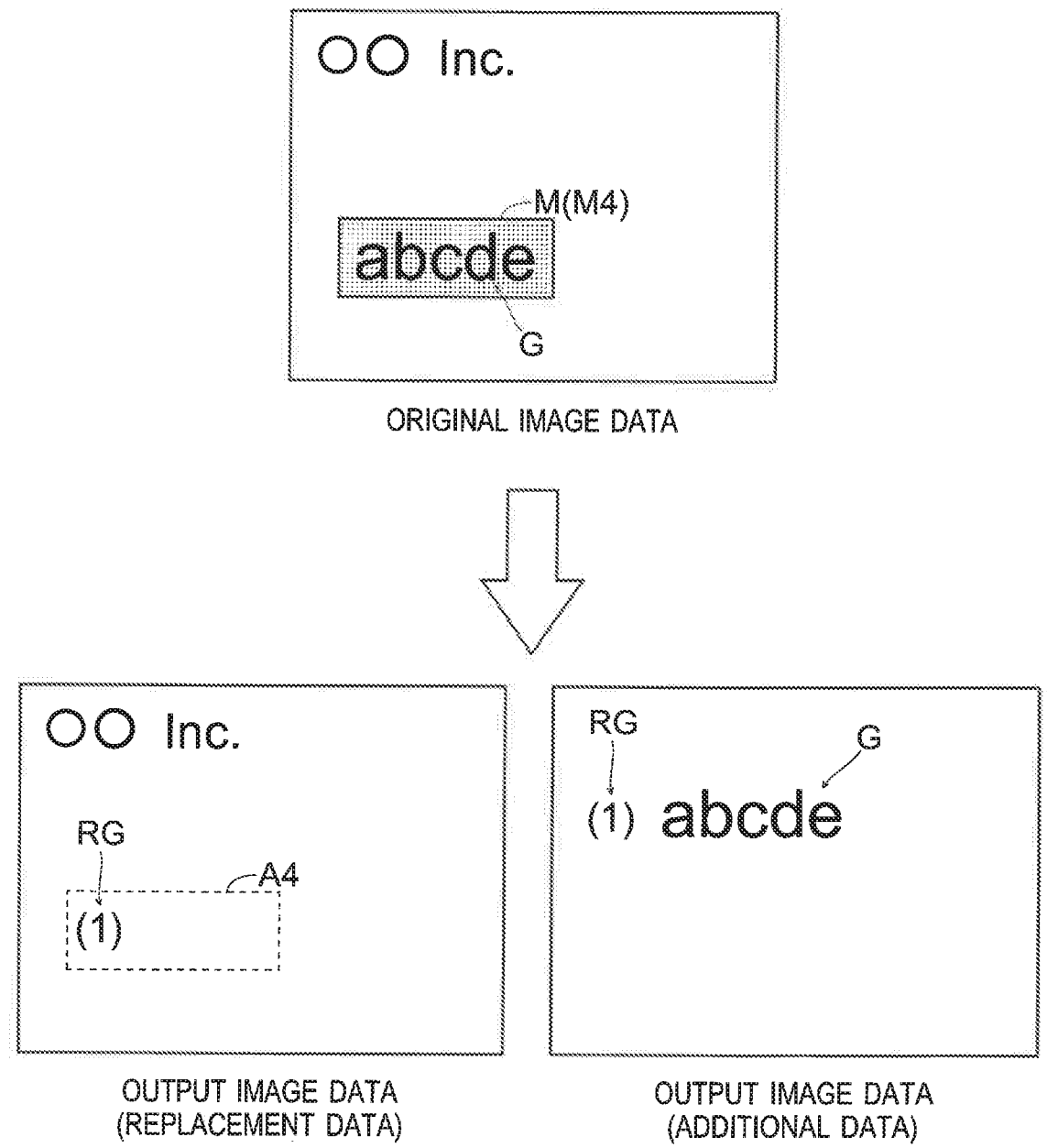
FIG. 9 is a diagram illustrating a fourth process performed by the control portion in the image forming apparatus according to the embodiment of the present disclosure.

In a case where original image data as shown in FIG. 9 is fed into the image forming apparatus 100, the marked region M4 is yellow; thus, out of the plurality of processes (first to fourth processes), the fourth process, which is associated with yellow, is performed by the control portion 1. That is, the fourth process is the target process. The fourth process as an encoding process is a replacement process.

In a case where the target process is the fourth process (replacement process), as shown in FIG. 9, the control portion 1 generates, as output image data, replacement data in which the image G of the marked region M4 in the original image data has been replaced with an image RG corresponding to previously registered information (character information including characters, numerals, symbols, and the like). In FIG. 9, the region in the output image data corresponding to the marked region M4 is indicated by the symbol A4, and the region A4 is enclosed by a broken line.

Registration of character information is accepted from the user on the operation panel 5. Registration of character information may be handled also from the user terminal 200. Information registered by the user is stored in the storage portion 2.

The control portion 1 also generates, as output image data, additional data including an image G of the marked region M4. For example, the additional data may include the image RG as well. When, as output image data, replacement data and additional data are generated, the printing portion 4 prints an image based on the replacement data on one sheet P and prints an image based on the additional data on another sheet P.

As described above, according to the embodiment, an image forming apparatus 100 includes: an image reading portion 3 (input portion) that feeds original image data to the image forming apparatus 100; a control portion 1 that generates output image data based on the original image data; a printing portion 4 that performs printing based on the output image data; and a storage portion 2. The storage portion 2 stores associated color information that defines colors respectively associated with a plurality of prescribed encryption processes (a first, a second, a third, and a fourth process). When generating the output image data, the control portion 1, if the original image data includes a marked region M, recognizes a color of the marked region M and performs, out of the plurality of processes, the process associated with the color of the marked region M.

With the configuration according to the embodiment, by marking information to be encrypted in a document D (encryption target information) with a red fluorescent pen (i.e., by making a marked region M red), it is possible to make the image forming apparatus 100 perform the first process (encoding process); by marking encryption target information with a blue fluorescent pen (i.e., by making a marked region M blue), it is possible to make the image forming apparatus 100 perform the second process (blacking-out process); by marking encryption target information with a green fluorescent pen (i.e., by making a marked region M green), it is possible to make the image forming apparatus 100 perform the third process (erasing process); and by marking encryption target information with a yellow fluorescent pen (i.e., by making a marked region M yellow), it is possible to make the image forming apparatus 100 perform the fourth process (replacement process). Thus, it is possible to change what is performed as an encryption process on the image forming apparatus 100 according to the color of the fluorescent pen used for marking (the color of the marked region).

When the first process is performed on the image forming apparatus 100, a code image CD in which the encryption target information has been encoded is printed on a sheet P. This provides enhanced convenience to a user who wants to print a code image CD corresponding to encryption target information on a sheet P. Moreover, when the encoding process is performed, encryption target information is not printed (it is either blacked out or erased). This prevents divulgence of encryption target information.

In a modified example of the first process, the user can specify the arrangement position of the code image CD. This provides further enhanced convenience to the user.

When the blacking-out process is performed on the image forming apparatus 100, a print result in which encryption target information has been blacked out is output. On the other hand, when the erasing process is performed on the image forming apparatus 100, a print result in which encryption target information has been erased is output. This prevents divulgence of encryption target information.

When the replacement process is performed on the image forming apparatus 100, a print result in which encryption target information has been replaced with an image RG corresponding to previously registered character information is output. Moreover, the encryption target information (the image G of a marked region M4) is printed on another sheet P. An image forming apparatus 100 that can perform such a process is effective in printing separately a sheet P on which examination problems are printed and a sheet P on which the answers are printed.

The embodiment disclosed herein should be understood to be in every aspect illustrative and not restrictive. The scope of the present disclosure is defined not by the description of the embodiment given above but by the appended claims and encompasses any modifications made within the spirit and scope of what is recited in the claims.

For example, original image data may be transmitted from the user terminal 200 to the image forming apparatus 100. The original image data transmitted from the user terminal 200 is received by the communication portion 6. In other words, the communication portion 6 feeds original image data into the image forming apparatus 100. In this case, the communication portion 6 functions as an "input portion".

Instead, a region underlined in a predetermined color in original image data may be detected as a marked region.

What is claimed is:

1. An image forming apparatus comprising:
    an input portion that feeds original image data to the image forming apparatus;
    a control portion that generates output image data based on the original image data;
    a printing portion that performs printing based on the output image data; and
    a storage portion,
    wherein
    the storage portion stores associated color information that defines colors associated with a plurality of prescribed processes respectively,
    when generating the output image data, the control portion, if the original image data includes a marked region, recognizes a color of the marked region and performs, out of the plurality of processes, the process associated with the color of the marked region,
    one of the plurality of processes is an encoding process,
    when the process associated with the color of the marked region is the encoding process, the control portion
        generates a code image in which information included in the marked region has been encoded,
        generates, as the output image data, data in which the marked region in the original image data has been converted to a blacked-out region or a blank region and which includes the code image, and
    when the original image data includes a position specifying image in a same color as the marked region, the control portion sets a position of the position specifying image as a target position and arranges the code image at the target position.

2. The image forming apparatus according to claim 1, wherein
    when the original image data does not include the position specifying image, the control portion generates, as the output image data,
        first data in which the marked region in the original image data has been converted to the blacked-out region or the blank region and
        second data which is separate from the first data and which includes the code image.

3. The image forming apparatus according to claim 1, wherein
    one of the plurality of processes is a blacking-out process, and
    when the process associated with the color of the marked region is the blacking-out process, the control portion generates, as the output image data, data in which the marked region in the original image data has been converted to a blacked-out region.

4. The image forming apparatus according to claim 1, wherein
    one of the plurality of processes is an erasing process, and
    when the process associated with the color of the marked region is the erasing process, the control portion generates, as the output image data, data in which the marked region in the original image data has been converted to a blank region.

5. The image forming apparatus according to claim 1, wherein
    one of the plurality of processes is a replacement process, and
    when the process associated with the color of the marked region is the replacement process, the control portion generates, as the output image data, replacement data in which an image of the marked region in the original image data has been replaced with an image corresponding to previously registered information.

6. The image forming apparatus according to claim 5, wherein
    the control portion generates, as the output image data, additional data which is separate from the replacement data and which includes the image of the marked region.

* * * * *